April 29, 1952        G. BROWN        2,594,539
INSECTICIDE DISPENSER
Filed Sept. 8, 1945        5 Sheets-Sheet 1
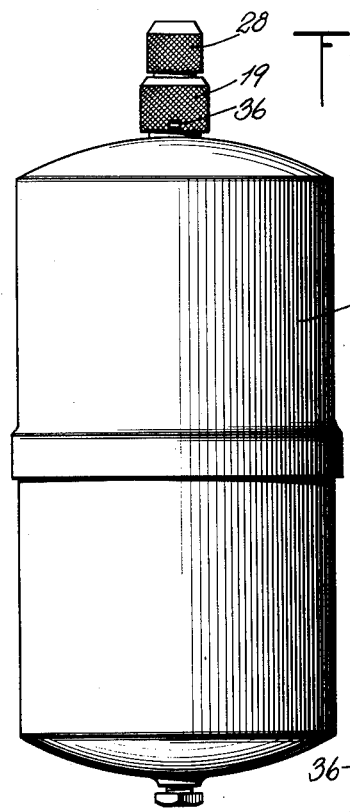
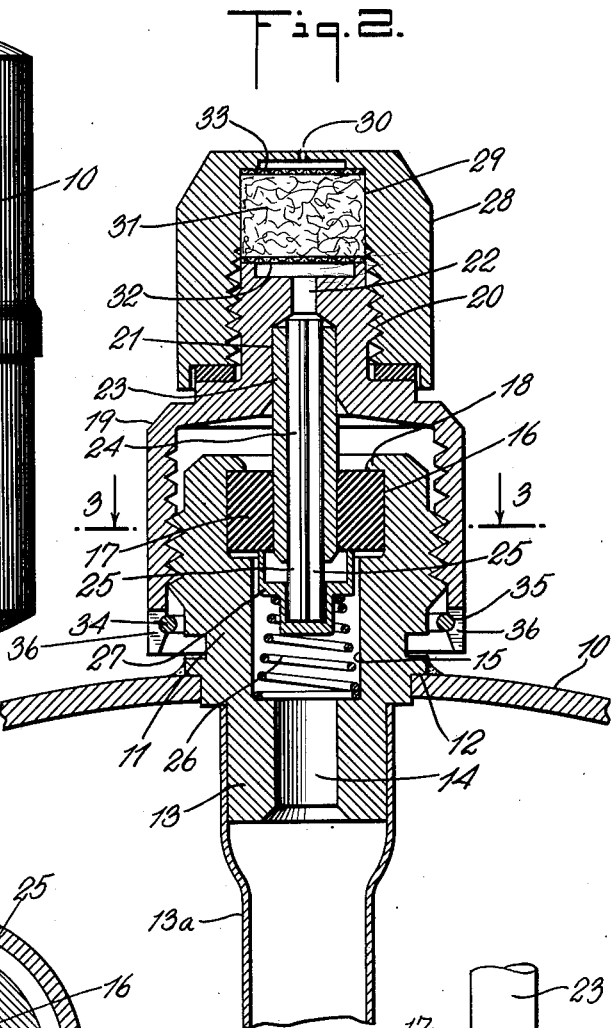
INVENTOR.
GREGORY BROWN
BY
Kenyon & Kenyon
ATTORNEYS April 29, 1952 G. BROWN 2,594,539
INSECTICIDE DISPENSER
Filed Sept. 8, 1945 5 Sheets-Sheet 2

INVENTOR.
GREGORY BROWN
BY
Kenyon & Kenyon
ATTORNEYS

April 29, 1952
G. BROWN
2,594,539
INSECTICIDE DISPENSER
Filed Sept. 8, 1945
5 Sheets-Sheet 3
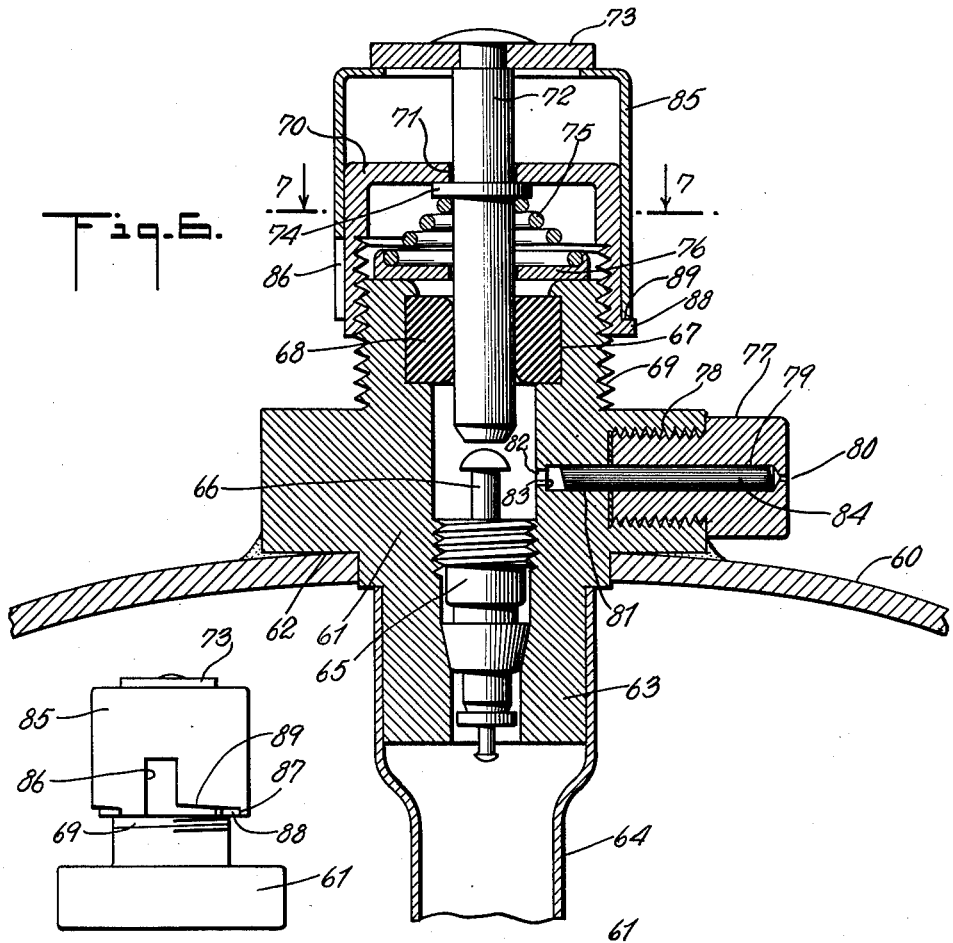
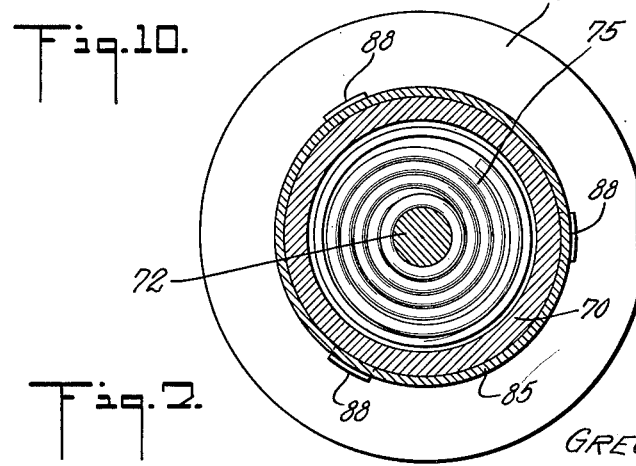
INVENTOR.
GREGORY BROWN
BY
Kenyon & Kenyon
ATTORNEYS

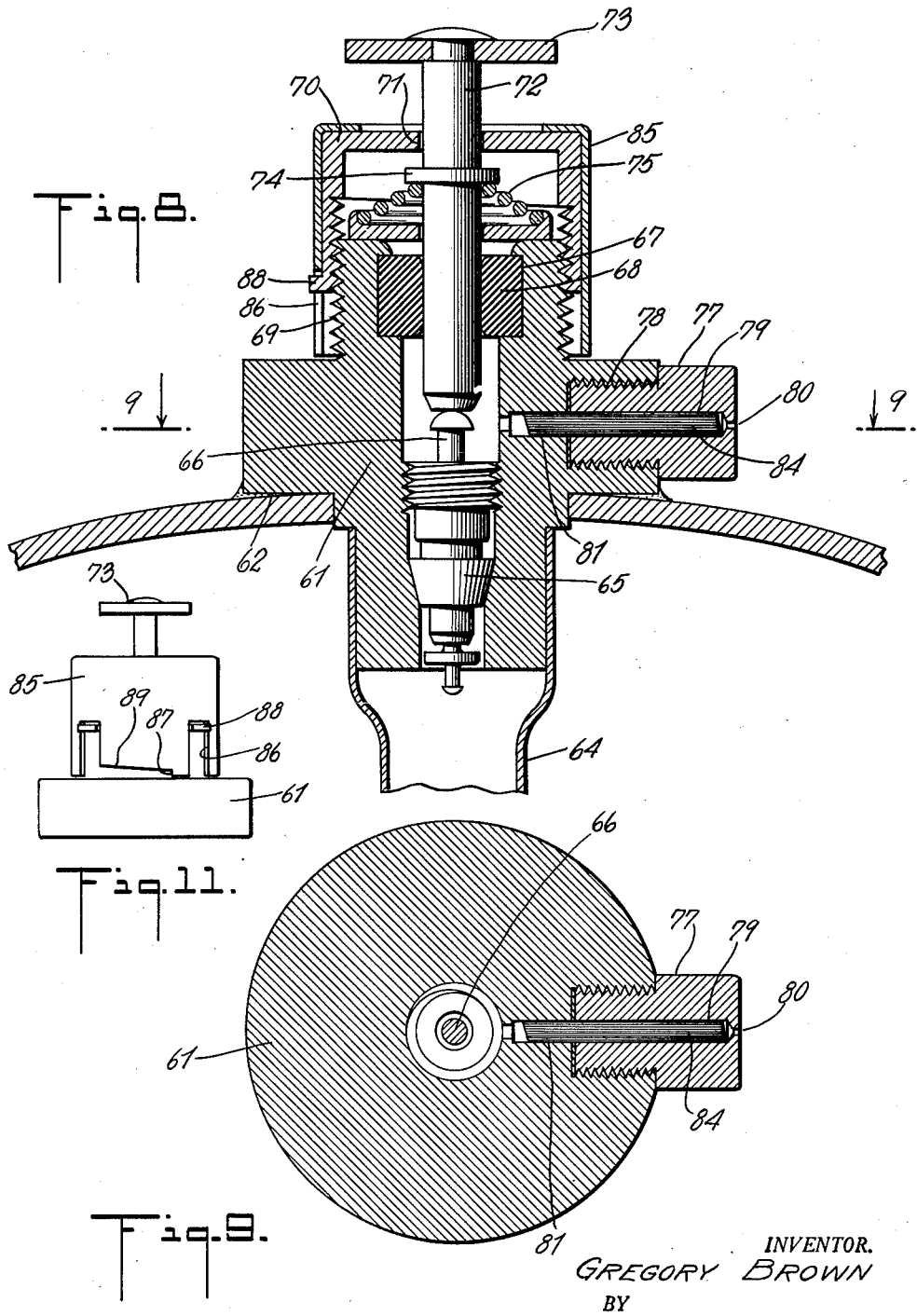

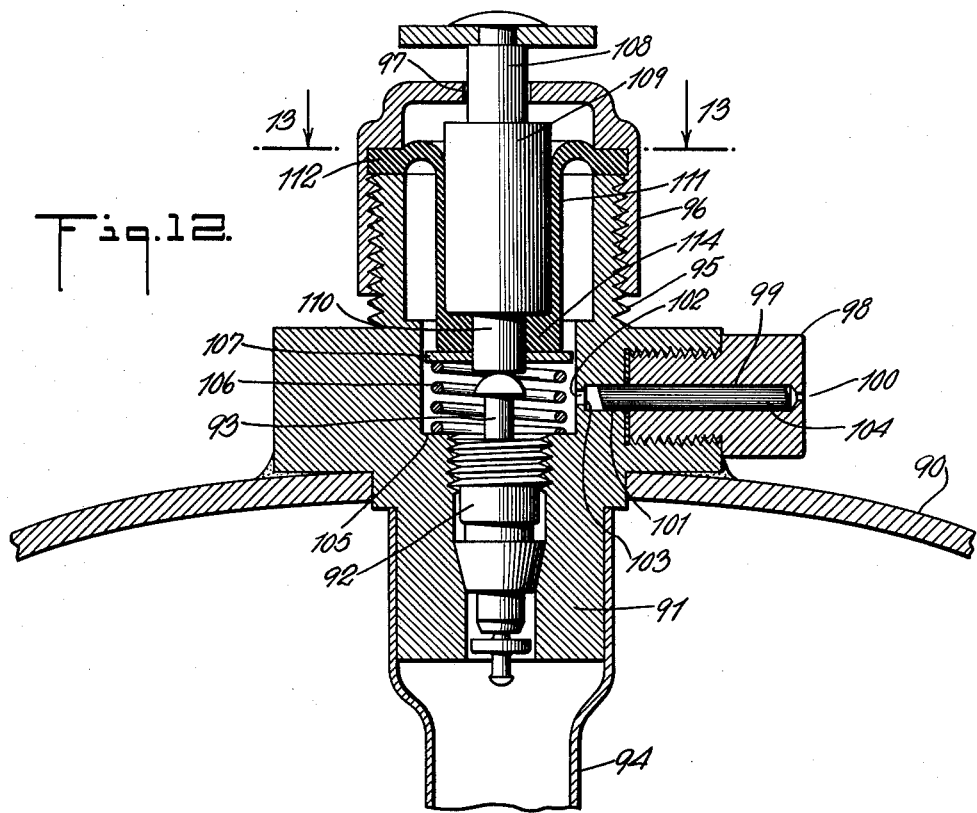
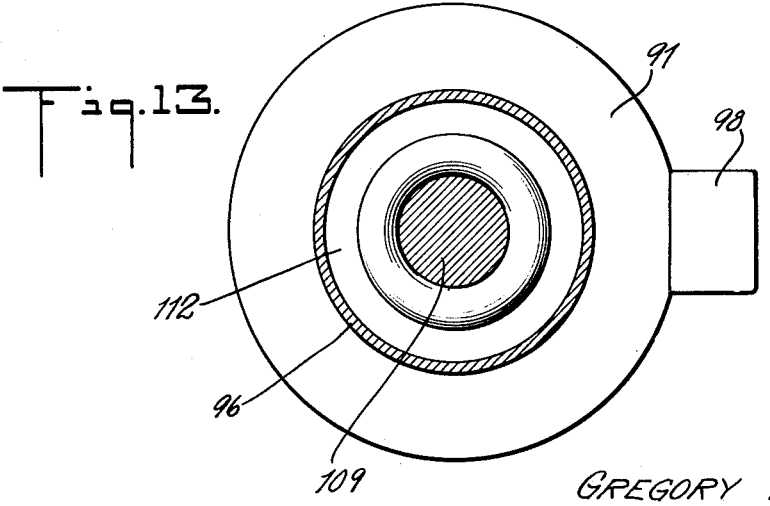

Patented Apr. 29, 1952

2,594,539

UNITED STATES PATENT OFFICE 2,594,539

INSECTICIDE DISPENSER

Gregory Brown, Bridgeport, Conn., assignor to Bridgeport Brass Company, Bridgeport, Conn., a corporation of Connecticut Application September 8, 1945, Serial No. 615,221

1 Claim. (Cl. 299—95)

This invention relates to dispensing apparatus for use in connection with the distribution or dispersion of insecticides, fumigants, hormones and the like.

The patent to Goodhue, et al. No. 2,321,023 discloses a method of producing insecticidal aerosol which involves confining in a receptacle under superatmospheric pressure a liquefied gas containing in solution a suitable insecticide and releasing the receptacle contents as desired through a discharge orifice into the atmosphere. The receptacle contents are forced out into the atmosphere by the high vapor pressure of the liquefied gas and the liquid solvent instantly evaporates into the atmosphere separating the solute into particles of colloidal dimensions and leaving them suspended in air in the form of an aerocolloid which is known as an aerosol.

An object of this invention is an inexpensive and highly efficient device for dispensing insecticides, fumigants and hormones, etc. in accordance with the Goodhue, et al. method.

Other objects, novel features and advantages of this invention will become apparent from the following specification and accompanying drawings, wherein:

Fig. 1 is an elevation of a device embodying the invention;

Fig. 2 is a section through one embodiment of valve mechanism for controlling discharge from the device;

Fig. 3 is a section on the line 3—3 of Fig. 2;

Fig. 6 is a section through a third embodiment of valve mechanism with the mechanism in closed position;

Fig. 7 is a section on the line 7—7 of Fig. 6;

Fig. 8 is a view similar to Fig. 6 with the valve mechanism in open condition;

Fig. 9 is a section on the line 9—9 of Fig. 8;

Fig. 10 is a fragmentary elevation of Fig. 6;

Fig. 11 is a fragmentary elevation of Fig. 8;

Fig. 12 is a section through a fourth embodiment of valve mechanism;

Fig. 13 is a section on the line 13—13 of Fig. 12; and

Fig. 14 is a fragmentary section similar to Fig. 2 prior to complete assembly.

Figure 4:
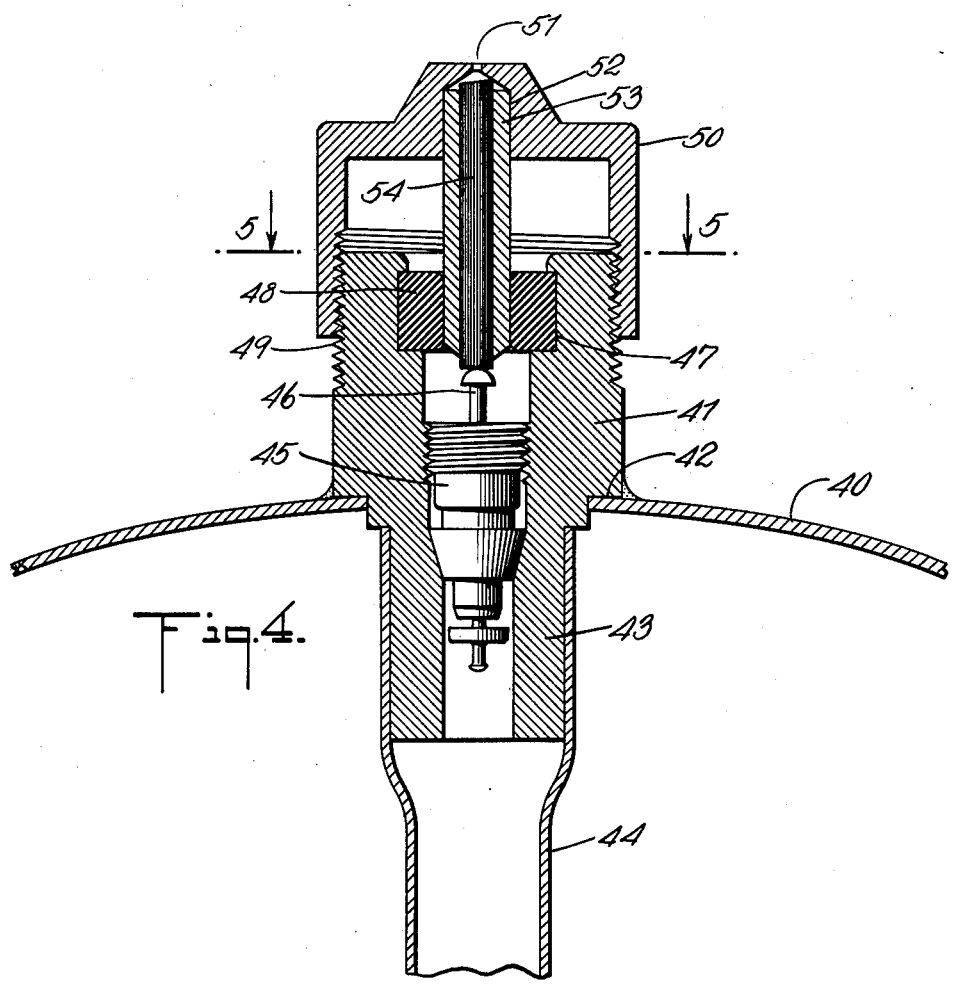
Fig. 4 is a section through a second embodiment of valve mechanism.

Referring now more especially to Figs. 1 to 3 inclusive, 10 is a generally cylindrical metal casing with dome-like ends and receives under pressure a liquefied gas containing in solution an insecticide, fumigant, hormone, etc. The receptacle may be approximately 6" long and approximately 3" in diameter so that it may be readily held in a person's hand and directed as desired. At one end, the casing is provided with suitable means for discharging the receptacle contents into the atmosphere.

The discharge means includes a tubular member 11 projecting through an aperture in one end of the receptacle and preferably formed with a shoulder 12 which engages the outer surface of the receptacle end. A gas-tight seal is established between the receptacle 10 and the member 11 by any suitable means. The inner end of the tubular member 11 is formed with a reduced diameter portion 13 around which tightly fits one end of a tube 13a extending substantially to the opposite end of the receptacle.

The passageway through the member 11 is composed of three sections 14, 15 and 16 of progressively increasing diameter from the inner end of the member 11 outwardly. In the passageway section 16 is provided an elastic ring 17 preferably composed of synthetic rubber such, for example, as neoprene and having gas-tight contact with the curved cylindrical surface of the section 16, said ring being held in place by an inwardly projecting lip 18 which may act as a seal. A cap 19 has threaded engagement with the member 11 whereby rotation of the cap on the member 11 produces axial movement of the cap relative to the member. The cap 19 is provided with a threaded extension 20 formed with a bore having a large diameter section 21 and a small diameter section 22. In the large diameter section 21 there is fitted a sleeve 23 which extends through the bore in the ring 17 and is suitably fixed to the cap 19 while being rotatable in the washer 17. As shown in Fig. 14, the ring 17 is molded with a slight inward bulge 17a. The maximum diameter of the ring bore slightly exceeds the diameter of the sleeve 23 while the minimum diameter of said bore is slightly less than said sleeve thereby insuring a gas-tight fit of the ring around the sleeve. A rod 24 is fitted into the bore of the sleeve 23 for movement therewith and is of suitable cross section to provide channels 25 lengthwise of the sleeve 23 (Fig. 3).

In the passageway 15 there is provided a helical expansion spring 26, one end of which supports a cup shaped element 27 facing the ring 17. The cup element 27 has a bottom cylindrical recess 27a and the rod 24 projects below the washer 17 a sufficient distance to enter the cup recess 27a which is of slightly larger cross section than the rod so that the latter fits the former loosely. The rod serves to maintain the cup 27 always in axial relation to the ring 17 and the loose fit of the rod in the cup permits the cup to accommodate itself on the rod in proper position to insure tight engagement of the cup rim with the ring 17. The arrangement of the rod 24 in the member 17 is such that when the cap 19 is screwed on to the member 11 less than the total extent of its possible travel, the end of the rod 24 engages the bottom of the recess 27a. Thus, in one position of the cap 19, the rim of the cup 27 is held in sealing engagement with the ring 17 but upon additional rotation of the cap 19, the rod 24 is projected inwardly to move the cup 27 out of engagement with the washer 17.

On the threaded extension 20 of the cap 19 is mounted a threaded discharge element 28 provided with a chamber 29 communicating with the bore section 21 of the extension 20. In the outer end of the discharge element 28 is provided a discharge orifice 30 and a body of filtering material 31 is contained within the chamber 29 between screens 32 and 33 at opposite ends of the chamber 29.

With the cap 19 in the position shown in Fig. 2, the cup 27 forms a gas-tight seal with the washer 17 to prevent the discharge of the receptacle contents. When it is desired to discharge the receptacle contents, the cap 19 is properly rotated to move the rod 24 inwardly, thereby disengaging the rim of the cup 27 from the washer 17. The receptacle contents flow by way of the tube 13a through the passageway sections 14 and 15 around the rim of the cup 27 into the interior of the cup and thence through the channels 25 into the chamber 29 and through the filtering medium 31 to the discharge orifice 30 through which it escapes into the atmosphere. The liquefied carrier very greatly expands upon its release and changes in state from liquid to gas form with concomitant conversion of the solute into an aerosol as described in the aforementioned Goodhue, et al. patent. Reverse rotation of the cap 19 withdraws the rod 24 and permits return of the cup 27 into sealing contact with the washer 17 under the influence of the pressure existing within the receptacle 10.

The filtering material 31 serves to remove from the liquid passing through it any solid particles which might otherwise tend to clog the discharge orifice 30. Further, the filtering material serves to control the rate of discharge as well as to facilitate the production of a dry spray. It also is effective to produce a pressure drop in the liquid flowing through it, thereby minimizing the possibility of streaming of the discharge fluid when pressure in the receptacle 10 exceeds approximately 80 lbs. per square inch, it having been determined that discharge of the liquid contents through the aperture 30 at greater than approximately 80 lbs. per square inch frequently results in streaming. The diameter of the discharge orifice 30 as well as the discharge orifices in the embodiments later to be described is preferably of the order of .008 inch.

In order to prevent accidental removal of the cap 19, the snap ring 34 is mounted in an interior groove 35 near the open rim of the cap and is adapted to engage a sloping abutment formed at the inner end of the thread on the member 11. The angularity of the abutment is such as to press the ring 34 into the groove 35 upon engagement of the ring with the abutment. Engagement of the ring with the abutment limits outward movement of the cap 19 on the member 11. The open end of the cap 19 is chamfered to permit the snap ring easily to be pushed into place and a narrow slot 36 is provided across the open end of the cap 19 to permit the insertion of a proper tool to engage and withdraw the ring 34 when it is desired to remove the cap 19 from the member 11.

Figure 5:
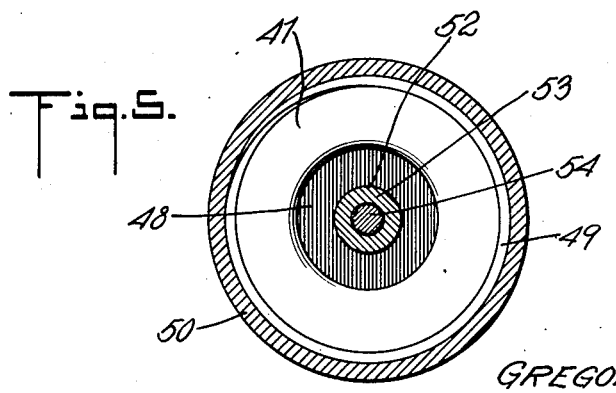
Fig. 5 is a section on the line 5—5 of Fig. 4.

In the embodiment of Figs. 4 and 5, 40 is the end of the cylindrical metal casing and a tubular metal member 41 projects through an aperture in the end 40 with a gas-tight seal being established between the receptacle and the member by any suitable means. Preferably, the member 41 is formed with a shoulder 42 which bears against the outer surface of the end 40 and with a reduced portion 43 within the receptacle. One end of a tube 44 is fitted tightly around the portion 43 and extends substantially to the opposite end of the receptacle. The bore of the member 41 is suitably shaped and threaded to receive a standard type tire valve 45 having the usual spring-pressed plunger 46. The exterior of the valve 45 forms an air-tight seal with the bore surface of the member 11 and effectively prevents flow of the receptacle contents from the receptacle except when the plunger 46 is depressed.

The bore of the member 41 is enlarged near its outer end to form an annular recess 47. In the recess is fitted a ring 48 of flexible material such, for example, as neoprene and is maintained against axial displacement by the two end walls of the recess. The outer end wall of the recess has a comparatively small overlap in the ring surface and the ring is introduced into position by being forced through the end of the bore with concomitant contraction of the ring until it is within the recess, after which it expands into gas-tight contact with the cylindrical surface of the recess.

The outer end of the member 41 is threaded at 49 to receive a threaded cap 50 having a central aperture 51 communicating with a socket 52 of much larger diameter than the aperture. In the socket 52 is received one end of a sleeve 53 which is fixed to the cap 50 and the other end of which is snugly but movably received in the bore of the ring 48. In the bore of the sleeve 53 is arranged a fluted rod 54, one end of which is slightly oblique to the rod axis and engages the cap 50 and the other end of which engages the plunger 46.

Rotation of the cap 50 on the tubular member 41 causes axial movement of the cap with corresponding axial movement of the sleeve 53. An air-tight seal is maintained between the sleeve 53 and th tubular member 41 at all times by the reason of the neoprene ring 43 interposed therebetween. The relation of the rod 54 to the plunger 46 is such that in one position of the cap 50 on the tubular member 41 the valve 45 is closed and in another position the valve is moved to open position as shown in Fig. 4. With the valve in open position, the receptacle contents flow upwardly through the tube 44 and the valve 45 and along the grooves in the fluted rod 54 and thence through the discharge orifice 51 into atmosphere. The grooves are of sufficiently small cross-section to act as a filter to prevent small solid particles from reaching the orifice 51.

Referring now more especially to Figs. 6 to 11 inclusive, 60 is the end of a substantially cylindrical receptacle through an aperture in one end of which projects a tubular member 61 preferably formed with a shoulder 62 engaging the outer surface of the receptacle end. A gas-tight seal is established between the receptacle and the member 61 by any suitable means and the inner end of the tubular member 61 is formed with a reduced portion 63 around which tightly fits one end of a tube 64 extending substantially to the opposite end of the container.

The bore of the member 61 is suitably shaped and threaded to receive a standard type tire valve 65 having the usual spring-pressed plunger 66. The exterior of the valve 65 forms an air-tight seal with the bore surface of the member 61 and effectively prevents flow of liquid from the receptacle except when the plunger 66 is depressed.

The bore of the member 61 is enlarged near its outer end to form an annular recess 67. A ring 68 of flexible material such, for example, as neoprene is fitted into the recess 67 and is maintained against axial displacement by the end walls of the recess. The outer end wall of the recess has a comparatively small overlap on the ring surface and the ring is introduced into position by being forced through the end of the bore with concomitant contraction of the ring until it is within the recess, after which it expands into contact with the cylindrical surface of the recess.

The outer end of the member 61 is threaded at 69 to receive a threaded cap 70 having a central aperture 71. A rod 72 having a button 73 at its outer end extends through the aperture 71 and is snugly but slidably received in the bore of the ring 68. The rod 72 is provided with a collar 74 adapted to engage the inner surface of the cap 70 to limit outward movement of the rod 72. A spiral spring 75 has one end engaging the collar 74 and the other end engaging a plate 76 resting on the outer end of the member 61 and having an aperture through which the rod 72 projects. The spring 75 biases the rod 72 toward the position in which the collar 74 engages the inner surface of the cap 70 in which position the plunger 66 is in valve-closing position.

A bushing 77 is threaded into a recess 78 in the member 61 and has a central bore 79 terminating in an orifice 80. In the member 61 is provided a passageway 81 in alinement with the bore 79 and communicating through an opening 82 of less diameter than the passageway with the bore of the member 11 to form a shoulder 83. In the bore 79 is arranged a fluted rod 84, one end of which is oblique to the rod axis and engages the conical surface leading from the outer end of the bore 79 to the orifice 80 and the other end of which engages the shoulder 83.

A cup-shaped hood 85 fits over the cap 70 and has an aperture through which the rod 72 extends, the aperture being of less area than the button 73. The circular wall of the hood 85 is provided with three uniformly spaced longitudinal slots 86 leading from the hood rim and the rim of the hood is cut back for a short distance adjacent each slot 86 to form shoulders 87. The cap 70 is provided with three uniformly spaced radial studs 88 underlying the rim of the hood for engagement with the surfaces 89 between the slots 86 and the shoulders 87. With the hood 85 in the position shown in Figs. 6 and 10, the hood is held in position to engage its top surface with the under surface of the button 73, thereby preventing inward movement of the rod 72. The surfaces 89 are slightly oblique and of such arrangement that rotation of the cap 85 binds the surfaces against the studs 88 before engagement of the shoulders 87 with the studs 88. Rotation of the hood 85 to locate the slots 86 in alinement with the studs 87 as shown in Figs. 8 and 11, permits movement of the hood 85 inwardly to provide sufficient clearance between the outer wall of the hood and the inner surface of the button 73 to allow movement of the rod 72 to actuate the plunger 66 to open the valve 65.

With the hood 85 in its Figs. 8 and 11 position, the receptacle contents may be released through the orifice 80 by inward movement of the rod 72 against the action of the spring 75 to depress the plunger 66 and open the valve 65. Then, as shown in Fig. 8, the receptacle liquid flows upwardly through the tube 64, the valve 65, along the grooves in the fluted rod 84 and thence through the discharge orifice 80. An air-tight seal is maintained between the rod 72 and the tubular member 61 at all times by reason of the neoprene ring 68 interposed therebetween. The flutes of the rod 84 act as a filter in the manner previously described.

In the embodiment of Figs. 12 and 13, the end 90 of a casing supports a tubular member 91 in which is mounted a standard type tire valve 92 having a plunger 93. A tube 94 leads from the inner end of the member 91 to approximately the opposite end of the receptacle 90. A hermetical seal is provided between the member 91 and the receptacle 90 and the outer end of the member 91 is threaded at 95 to receive a threaded cap 96 having a central aperture 97.

A bushing 98 is threaded into a recess in the member 91 and has a central bore 99 terminating in an orifice 100. In the member 91 is provided a passageway 101 in alinement with the bore 99 and communicating through an aperture 102 of reduced diameter with the bore of the member 91 to form a shoulder 103. In the bore 99 is arranged a fluted rod 104, the outer end of which is oblique to the rod axis and engages the conical surface leading from the outer end of the bore 99 to the orifice 100 while the other end engages the shoulder 103.

The bore of the member 91 is slightly enlarged above the threaded portion of the valve 92 to provide a shoulder 105 on which rests one end of a spring helix 106, the other end of which supports an apertured plate 107. A rod 108 extends through the aperture 97 and has an enlarged cylindrical portion 109 terminating at its inner end in a reduced diameter projection 110. A cylindrical element 111 composed of elastic material has a flange 112 interposed between the end of the member 91 and a shoulder 113 formed in the cap 96. At its inner end, the element 111 is provided with a relatively heavy annular portion 114 engaging the plate 107 and through which extends the projection 110 into engagement with the end of the plunger 93 of the valve 92.

With the various parts in the arrangement shown in Fig. 12, the valve 92 is closed. Inward movement of the rod 108 causes movement of the plunger 93 to open the valve 92 and the spring 106 normally biases the rod 108 into valve-closing position. Upon inward movement of the rod 108 to open the valve 92, liquid flows from the interior of the receptacle through the tube 94, the valve 92, along the grooves in the fluted rod 104 and thence through the discharge orifice 100. The element 111 maintains an air-tight seal between the member 91 and the rod 108.

In order to charge the embodiment illustrated in Figs. 1 to 3 inclusive with liquefied gas containing in solution an insecticide, fumigant, hormone or the like, a suitable conduit is attached to the outer end of the member 11 with the cap 19 removed together with the sleeve 23 and rod 24 carried by the cap and a vacuum is drawn in the receptacle 10. Then, by operation of suitable valve means, the liquid gas and its solute may be introduced by way of the same conduit through the bore of the member 11 into the interior of the receptacle, the cup element 27 being moved out of sealing position by reason of the pressure applied thereto to allow free flow of the liquid into the receptacle. After the receptacle has been filled, the cap 19 is applied to the member 11 and the device is ready for operation.

The embodiment illustrated in Figs. 4 and 5 may be similarly charged by attaching the conduit to the outer end of the member 43 with the cap 50 removed from the member 41 together with the sleeve 53 and rod 54 carried by the cap. The modifications illustrated in Figs. 6 to 13 inclusive may be similarly charged by attachment of suitable conduits to the sockets in the members 61 and 91 respectively with the bushings 77 and 98 removed, together with the rods 84 and 104 carried thereby. After the receptacles of the three last-mentioned modifications have been charged, they may be conditioned for use by putting in place respectively the cap 50, the bushing 77 and the bushing 98, together with the rods and sleeves carried thereby.

I claim:

A fluid valve including in combination an externally threaded tubular member having one end adapted for connection with a container, the inside of said member having a large bore portion at its other end and a smaller bore portion at its said container end and an intermediately sized bore portion therebetween, a coil spring in said intermediate bore portion, a cup in said intermediate bore portion with its bottom towards said spring and having a bottom recess fitting inside the adjacent end of said spring, an elastically deformable sealing ring retained in said large bore portion with an end facing and in sealing engagement by the rim of said cup so that the latter forms a check valve for said bore, a cap for said member with a tubular skirt having internal screw threads fitting the external threads on said member, said cap having a fluid passage extending from the inside of said skirt and opening to the atmosphere through an orifice small enough to eject a spray, a tube projecting from said passage through said skirt and adapted to be press-fitted through said sealing ring, and a longitudinally fluted rod positioned through said tube and positioned in said recess in said cup bottom, said rod being adapted to press said cup from said ring when said cap is screwed towards said member and to release said cup when oppositely screwed, said skirt being long enough to extend beyond the threads on said member toward its said container end and having an internally facing annular recess having a split spring ring clipped therein and with at least one longitudinally extending slot in said skirt intersecting said recess so that said ring may be unclipped from said recess by tool action working through said slot, said ring being sized to engage and jam against the end convolution of the external threads on said member towards said container end and to permit limited screw action inwardly and returning backwardly as required to unseat and seat the rim of said cup on said sealing ring.

GREGORY BROWN.

REFERENCES CITED

The following references are of record in the file of this patent:

UNITED STATES PATENTS

| Number | Name | Date |
| --- | --- | --- |
| 595,112 | Posgay | Dec. 7, 1897 |
| 750,637 | Goetz | Jan. 26, 1904 |
| 1,892,750 | Rotheim | Jan. 3, 1933 |
| 2,204,015 | Iftiger et al. | June 11, 1940 |
| 2,271,715 | Saffell et al. | Feb. 3, 1942 |
| 2,271,785 | Watkins | Feb. 3, 1942 |
| 2,305,286 | Ward | Dec. 15, 1942 |
| 2,369,356 | Koehn | Feb. 13, 1945 |

FOREIGN PATENTS

| Number | Country | Date |
| --- | --- | --- |
| 105,915 | Germany | Oct. 14, 1899 |
| 468,356 | France | Apr. 22, 1914 |
| 580,684 | Germany | Nov. 1, 1933 |
| 622,336 | France | Feb. 26, 1927 |